United States Patent [19]

Kitsukawa et al.

[11] Patent Number: 4,627,254

[45] Date of Patent: Dec. 9, 1986

[54] CUTTING DEVICE FOR A MULTI-DIMENSIONAL BENDING APPARATUS

[75] Inventors: Motohiko Kitsukawa; Atsuo Suzuki, both of Yokohama, Japan

[73] Assignee: Hashimoto Forming Industry Co., Ltd., Yokohama, Japan

[21] Appl. No.: 696,199

[22] Filed: Jan. 29, 1985

[30] Foreign Application Priority Data

| Jan. 30, 1984 | [JP] | Japan | 59-14793 |
| Jan. 30, 1984 | [JP] | Japan | 59-14794 |
| Jan. 31, 1984 | [JP] | Japan | 59-15925 |
| Jan. 31, 1984 | [JP] | Japan | 59-15926 |
| Jan. 31, 1984 | [JP] | Japan | 59-15927 |
| Jan. 31, 1984 | [JP] | Japan | 59-15928 |
| Sep. 28, 1984 | [JP] | Japan | 59-203868 |

[51] Int. Cl.[4] .................. B21D 11/14; B21D 43/28
[52] U.S. Cl. ............................ 72/6; 72/65; 72/130; 72/132; 72/168; 72/181; 72/299; 83/316
[58] Field of Search ............... 72/7, 129, 64, 65, 168, 72/173, 175, 177, 178, 181, 465, 247, 130, 132, 299, 6, 34; 83/315, 316, 317

[56] References Cited

U.S. PATENT DOCUMENTS

| 3,355,922 | 12/1967 | Utashiro et al. | 72/181 |
| 3,485,076 | 12/1969 | Colburn | 72/465 |
| 3,653,244 | 4/1972 | Tishken | 72/65 |
| 4,203,310 | 5/1980 | Krylov et al. | 72/247 |
| 4,367,641 | 1/1983 | Mizutani | 72/65 |
| 4,391,116 | 7/1983 | Yogo | 72/168 |

FOREIGN PATENT DOCUMENTS

| 127087 | 10/1979 | Japan | 83/317 |
| 56-102319 | 8/1981 | Japan | . |
| 57-44421 | 3/1982 | Japan | . |
| 58-47517 | 3/1983 | Japan | . |
| 58-43165 | 9/1983 | Japan | . |

Primary Examiner—E. Michael Combs
Attorney, Agent, or Firm—Stevens, Davis, Miller & Mosher

[57] ABSTRACT

A multi-dimensional bending apparatus is disclosed, wherein the entire length of the product is divided into a plurality of imaginary segments which are identified by detecting the continuously supplied length of an elongate material. The material is bent multi-directionally by a bending device including horizontal and vertical bending mechanisms and an axial twisting mechanism, which are individually actuated in response to the detected supplied length of the material. Multi-dimensionally bent, continuously supplied material is cut into the length of the product by means of a cutting device also actuated in response to the detected supplied length of the material, the cutting device including fixed and movable blade members which, during the cutting operation, are movable also in the direction in which the material is supplied. The movable blade member is formed with a slit with a side aperture through which the bent material having a lateral deflection moves out of the slit, permitting the return motion of the movable blade member. The cutting operation is effected without requiring an interruption of the continuous supply of the material.

4 Claims, 40 Drawing Figures

FIG_1
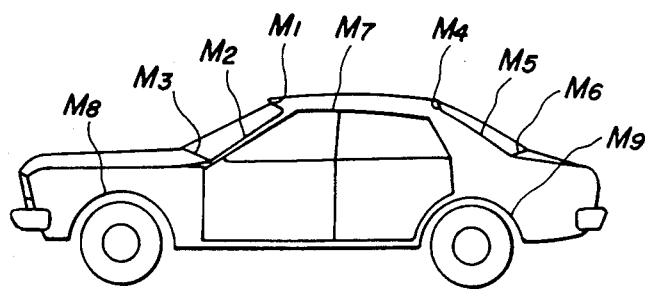
FIG_2(a)  FIG_2(b)  FIG_2(c)  FIG_2(d)
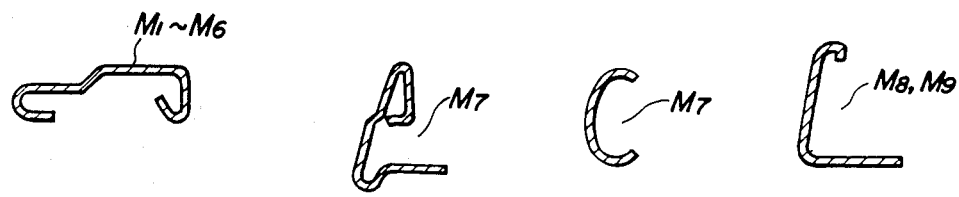
FIG_3
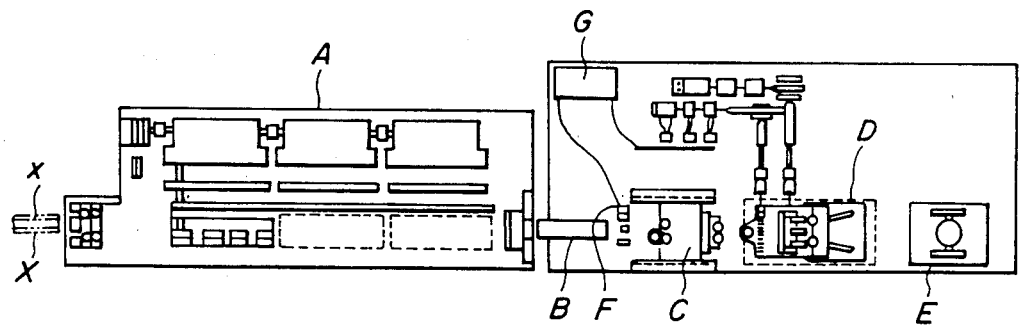

FIG_4
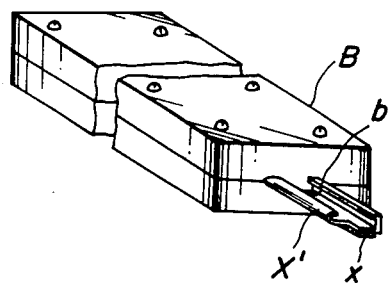
FIG_5
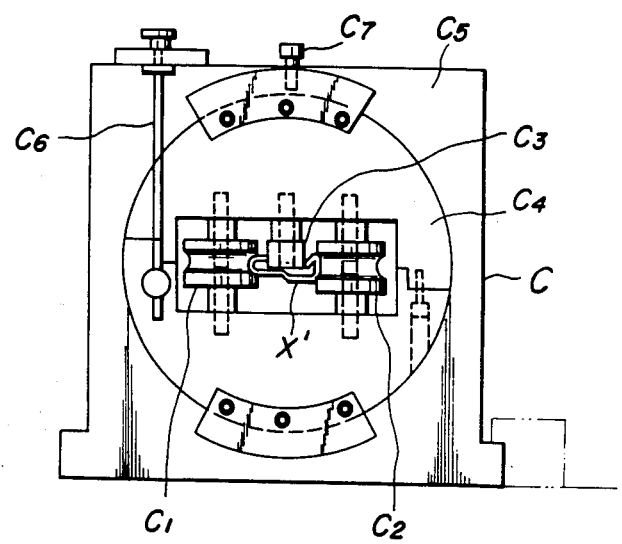
FIG_6
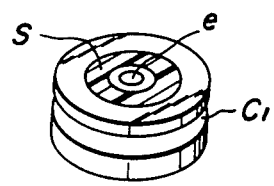

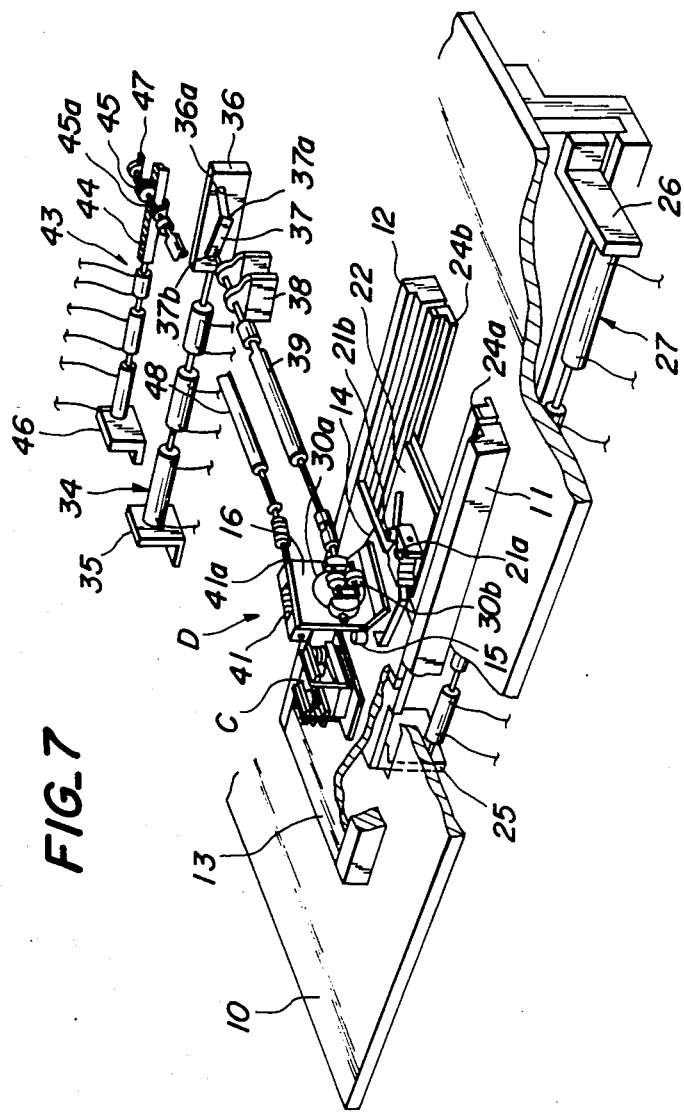

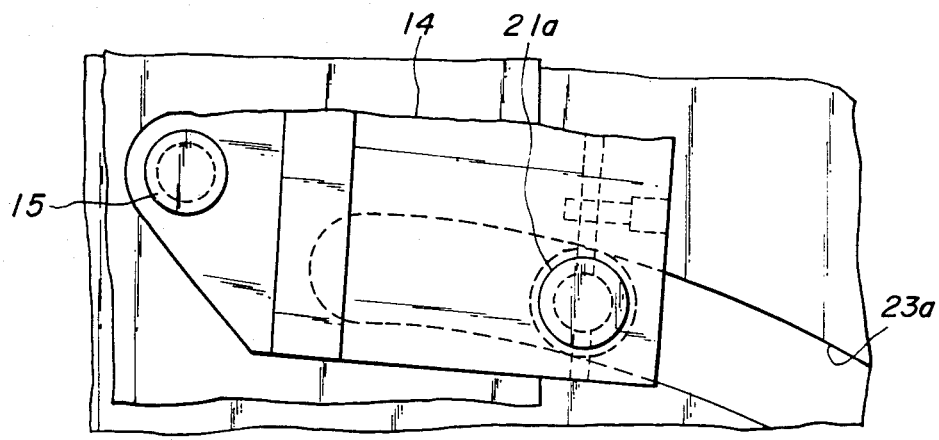
FIG_13
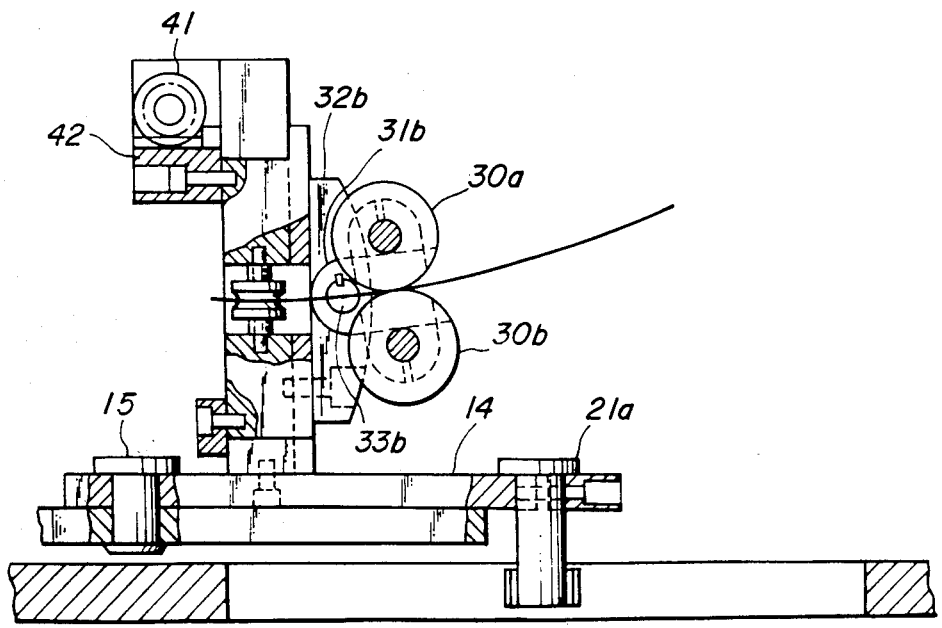
FIG_14

FIG.20

| Number of Segment | | 1 | 2 | ... | J | J+1 | ... | K | K+1 | ... | L | L+1 | ... |
|---|---|---|---|---|---|---|---|---|---|---|---|---|---|
| Horizontal Bending | ○ | 1000 | 1000 | | 1000 | 1000 | | 1000 | 2000 | | 2000 | 2000 | |
| Vertical Bending | □ | 800 | 800 | | 800 | 800 | | 800 | 800 | | 800 | 1500 | |
| Axial Twisting | ◇ | 20° | 20° | | 20° | 15° | | 15° | 10° | | 10° | 5° | |

| Number of Segment | | M | M+1 | ... | N | N+1 | ... | O−1 | O | ... | P−1 | P | ... |
|---|---|---|---|---|---|---|---|---|---|---|---|---|---|
| Horizontal Bending | ○ | 2000 | 3000 | | 3000 | 3000 | | 3000 | 3000 | | 3000 | 2000 | |
| Vertical Bending | □ | 1500 | 1500 | | 1500 | 1500 | | 1500 | 1500 | | 1500 | 1500 | |
| Axial Twisting | ◇ | 5° | 5° | | 5° | 0° | | 0° | 5° | | 5° | 5° | |

| Number of Segment | | Q−1 | Q | ... | R−1 | R | ... | S−1 | S | ... | T−1 | T | ... |
|---|---|---|---|---|---|---|---|---|---|---|---|---|---|
| Horizontal Bending | ○ | 2000 | 2000 | | 2000 | 1000 | | 1000 | 1000 | | 1000 | 1000 | |
| Vertical Bending | □ | 1500 | 1500 | | 1500 | 800 | | 800 | 800 | | 800 | 800 | |
| Axial Twisting | ◇ | 5° | 10° | | 10° | 15° | | 15° | 20° | | 20° | 20° | |

FIG.21

| Number of Segment | 1 | 2 | J | J+1 | K | K+1 | L | L+1 | M | M+1 | N | N+1 |
|---|---|---|---|---|---|---|---|---|---|---|---|---|
| Axial Twisting | | | | | | | ⫽ | | ⫽ | | ⫽ | |
| Vertical Bending | | | ⫽ | | ⫽ | | ⫽ | | ⫽ | | ⫽ | |
| Horizontal Bending | | | ⫽ | | ⫽ | | ⫽ | | ⫽ | | ⫽ | |

| Number of Segment | O-1 | O | P-1 | P | Q-1 | Q | R-1 | R | S-1 | S | T-1 | T |
|---|---|---|---|---|---|---|---|---|---|---|---|---|
| Axial Twisting | | | | | | | ⫽ | | ⫽ | | ⫽ | |
| Vertical Bending | | | ⫽ | | ⫽ | | ⫽ | | ⫽ | | ⫽ | |
| Horizontal Bending | | | ⫽ | | ⫽ | | ⫽ | | ⫽ | | ⫽ | |

FIG_26
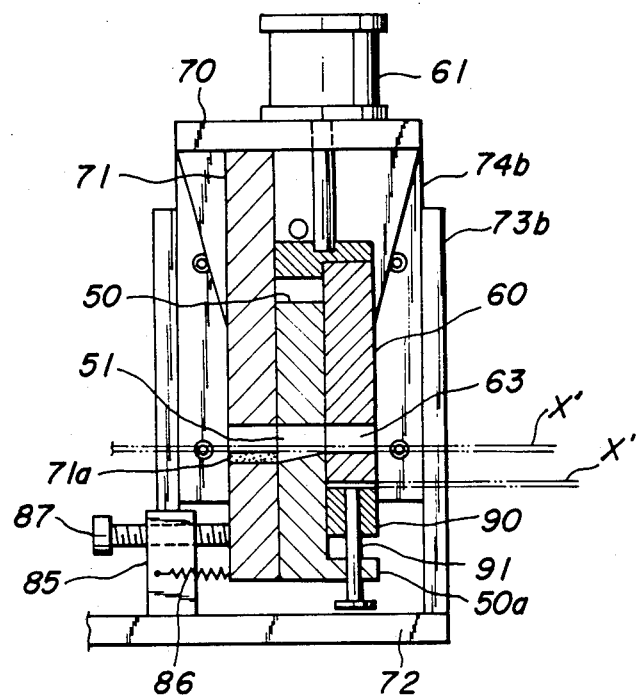
FIG_27
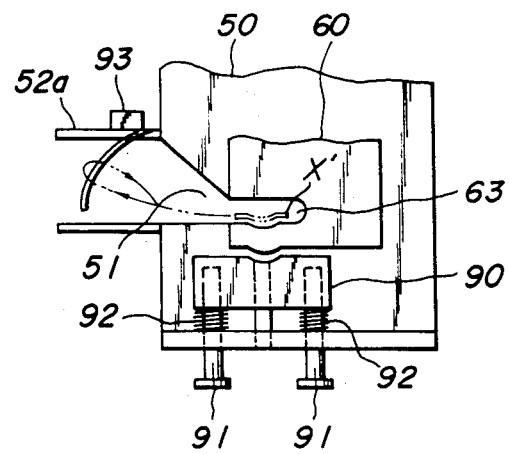

FIG_32a
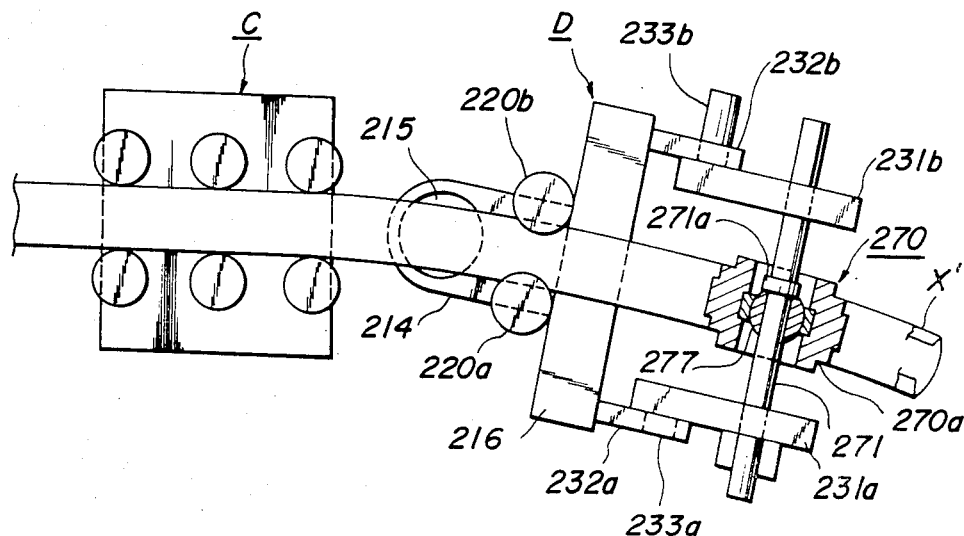
FIG_32b
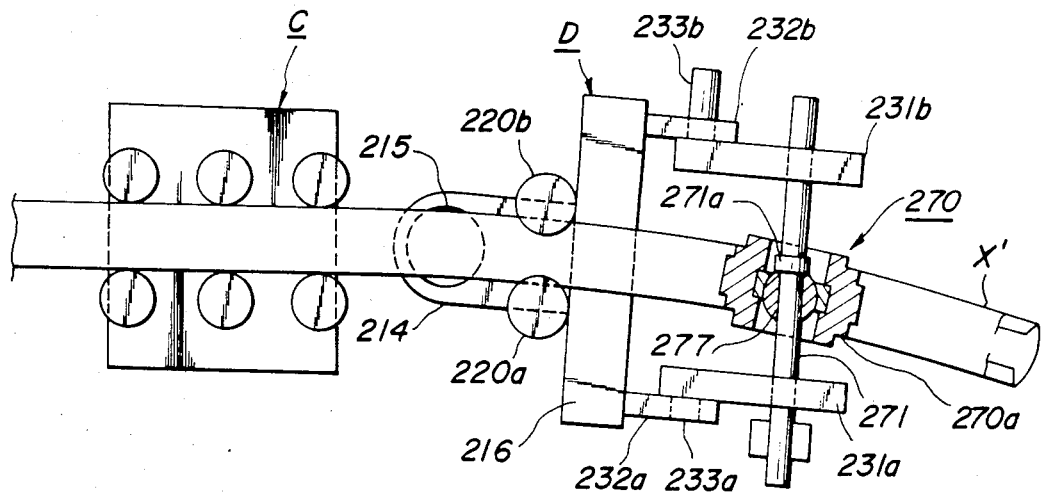

CUTTING DEVICE FOR A MULTI-DIMENSIONAL BENDING APPARATUS

BACKGROUND OF THE INVENTION

1. Field of the Invention

The present invention relates to a cutting device for a multi-dimensional bending apparatus for producing multi-dimensionally bent elongate articles, such as door sashes, various moldings for automobiles, and the like.

2. Description of the Prior Art

A multi-dimensional or complex bending machine for producing elongate articles having two- or three-dimensional curvature from continuously supplied elongate raw material is known, and disclosed e.g. in U.S. Pat. No. 4,391,116 issued on July 5, 1983. This known machine comprises a movable roller device including a pair of upper and lower bending rolls which are mounted on a rotary wheel by means of a universal joint mechanism. The rotary wheel is rotatably supported by a plurality of rollers mounted on a vertically slidable plate, and has gear teeth which are in mesh with gear teeth of the rollers. The vertically slidable plate mounts thereon a drive motor connected to one of the rollers for driving the rotary wheel, and is vertically slidably supported by a horizontally slidable plate. The horizontally slidable plate mounts thereon a second drive motor connected to the vertically slidable plate through a transmission mechanism, and is horizontally slidably supported by a pair of side frames. One of the side frames mounts thereon a third drive motor connected to the horizontally slidable plate through another transmission mechanism. The elongate material is supplied from stationary guide rollers, to be bent by the movable roller device multi-dimensionally.

An important problem encountered with the known bending machine resides in that, even when the bending machine itself is capable of processing continuously supplied elongate material, in order to cut the bent material into a predetermined length, the continuous supply of the material has to be interrupted during the period in which a movable blade member is moved to effect cutting and returned to its original position, so that a real improvement in the productivity cannot be achieved. There have been no proposals relating to an effective cutting device to which the bent material can be supplied continuously.

With the above-mentioned structure of the known bending machine, moreover, the overall arrangement is very bulky and costly, and more importantly, it proved to be very difficult to effect an accurate multi-dimensional bending of the elongate material owing to the following reasons. Firstly, since the bending rolls are mounted on the rotary wheel by a universal joint mechanism, and are not properly restrained from an unintentional motion, and also due to the time lag resulting from the inertia of the bending rollers and the universal joint mechanism, an elongate material cannot be bent accurately into a desired curvature, and may sometimes be snapped particularly in case of a slender material having a low bending rigidity. Secondly, during the bending operation, the rollers supporting and in mesh with the rotary wheel are applied with the reaction torque from the material, so that a large motor has to be used to drive the rotaty wheel with a sufficient torque. This results in an increase in the weight and inertia of the rotary wheel and the vertically slidable plate so that the starting and stopping operations of these elements cannot be accurately controlled. Similarly, the horizontally slidable plate is heavy in weight and has a large inertia since it carries the vertically slidable plate and drive motor and transmission mechanism therefor, among which the vertically slidable plate itself carries the universal joint mechanism, rotary wheel and drive motor and transmission mechanism therefor. Thus the starting and stopping operations of the horizontally slidable plate, either, cannot be accurately controlled.

Still another problem inherent to the known bending machine resides in the complexity of controlling the operation. More particularly, the bending is effected by controlling the machine by measuring the supplied length of the elongate material and on the basis of X-Y program including the vertical and horizontal sliding amounts of the movable elements. The program by which an accurate bending is effected is very complicated and difficult to prepare, and such a complexity is further enhanced when a three-dimensional bending is to be effected, or when it becomes necessary to axially twist the material depending upon the nature of the product.

SUMMARY OF THE INVENTION

Therefore, it is an object of the present invention to provide a cutting device to be combined with a multi-dimensional bending apparatus, wherein continuously supplied bent material can be cut into a predetermined length very efficiently.

Another object of the present invention is to provide a method of, and an apparatus for producing multi-dimensionally bent products with a high productivity, without requiring interruption of continuous supply of the material.

Another object of the present invention is to provide an apparatus for producing multi-dimensionally bent elongate articles accurately and economically, having minimized weight and inertia of movable elements, and being simple in construction, easy to control, and reliable in operation.

Another object of the present invention is to provide a method of producing multi-dimensionally bent elongate articles, whereby the operation of the bending apparatus can be controlled simply and accurately.

According to the present invention, there is provided an apparatus for producing multi-dimensionally bent elongate products, comprising: retaining means for retaining an elongate material laterally while guiding sliding movement of the material longitudinally thereof; detecting means for detecting the supplied length of the material; multi-dimensional bending means, actuated in response to the output signal of the detecting means, for continuously bending the material; and a cutting means, actuated in response to the output signal of the detecting means, for cutting continuously supplied, multi-dimensionally bent material.

According to the present invention, furthermore, there is provided a cutting device which comprises a fixed blade member formed therein with an opening through which the multi-dimensionally bent material is passed, and a movable blade member vertically movable with respect to, and kept in sliding contact with the fixed blade member, cutting edges being formed by the lower peripheral edge of the opening in the fixed blade member and the lower edge of the movable blade member, said blade members being movable also in the direction in which the material is supplied, synchronously with the cutting of the supplied material, said movable blade member having a lower dead point and being formed with a slit having a side aperture, which slit can be brought into alignment with the opening in the fixed blade member in the lower dead point of the movable blade member such that continuously supplied material is permitted to pass through the slit upon completion of the cutting, said slit having a width smaller than the maximum lateral excursion of the bent material and means to upwardly move the movable blade member to its original position when the bent material moves laterally out of said slit.

Preferably, the bending device comprises a base member, a bottom plate pivotably mounted on the base member so as to be angularly movable about a vertical axis, a vertical plate fixedly mounted on the bottom plate at right angle to the longitudinal axis of the material, horizontal bending means mounted on the vertical plate, for laterally retaining the material and permitting passage of the material therethrough, and vertical bending means arranged behind the horizontal bending rolls and pivotably mounted with respect to the vertical plate such that the vertical bending means is angularly movable about a common horizontal axis.

BRIEF DESCRIPTION OF THE DRAWINGS

FIG. 1 is a side view of an automobile with moldings which may be made in accordance with the present invention;

FIGS. 2(a) to 2(d) are sectional views of the moldings shown in FIG. 1, respectively;

FIG. 3 is a plan view of the complex bending machine according to one embodiment of the present invention;

FIG. 4 is a perspective view of the first retaining device shown in FIG. 3;

FIG. 5 is a front view of the second retaining device shown in FIG. 3;

FIG. 6 is a perspective view of the roll which may be used in the second retaining device shown in FIG. 5;

FIG. 7 is a perspective view illustrating the overall arrangement of the bending device shown in FIG. 3;

FIG. 13 is a partial plan view explaining the operation of the horizontal bending mechanism shown in FIGS. 7 and 11;

FIG. 14 is a partly sectional side view similar to FIG. 10, explaining the operation of the vertical bending mechanism;

FIG. 20 is a table showing the stored program memory used to produce the molding shown in FIG. 19;

FIG. 21 is an operational chart of the bending device in accordance with the stored program memory shown in FIG. 20;

FIG. 26 is a partly sectional side view similar to FIG. 24, with the cutting device in a position in which the cutting operation is completed;

FIG. 27 is a partial front view of the cutting device explaining the relation between the lateral deflection of the profiled body and the return motion of the movable blade member;

FIGS. 32(a) and 32(b) are partly sectional plan views similar to FIG. 30, explaining the operation of the vertical bending rolls.

DESCRIPTION OF THE PREFERRED EMBODIMENTS

Figure 8:
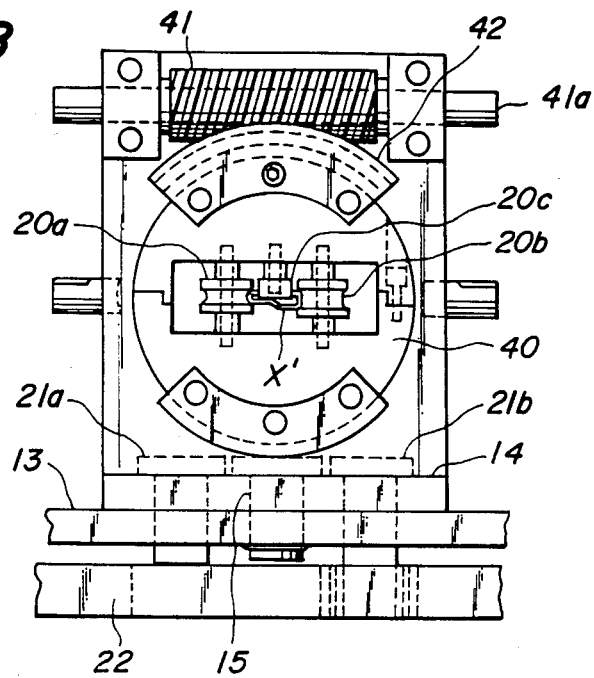
FIG. 8 is a front view thereof.

Referring to the accompanying drawings, the present invention will now be described in detail with respect to some preferred embodiments shown therein. As will be fully explained hereinafter, the present invention can advantageously be applied to accurately and economically produce moldings for automobiles or the like, having different length, cross-sectional shape and two- or three-dimensional curvature in accordance with the location of a vehicle body where the moldings are to be mounted. There is shown in FIG. 1 an automobile with various kinds of moldings, such as front and rear window moldings $M_1$ to $M_6$ (FIG. 2(a)), drip rail moldings $M_7$ (FIGS. 2(b) and 2(c)) and front and rear fender moldings $M_8$, $M_9$ (FIG. 2(d)). Conventionally, these moldings are produced from a strip-like raw material of plastically deformable thin plate, such as stainless steel or aluminum strip, which raw material is firstly bent into a predetermined cross-sectional shape, and is then bent multi-dimensionally to have a predetermined complex curvature longitudinally of the material.

According to the present invention, the raw material consists of a metal strip X which, preferably, is formed on its surfaces with protective film layers x of appropriate synthetic resin to prevent undesirable scratches from being made on the strip surfaces during the production steps of moldings. This metal strip X is continuously supplied to the bending machine of the present invention which comprises a cold roll forming device A with at least one pair of forming rolls to form the raw material X into an elongate and continuous profiled body X' having a predetermined cross-sectional shape. Thus obtained profiled body X' is further passed through first and second retaining devices B and C at a substantially constant speed, e.g. about 8 to 9 m/min, which retain the profiled body X' laterally while permitting a longitudinal sliding movement thereof. The profiled body X' is then supplied to a bending device D which effects the multi-dimensional or complex bending of the profiled body X'. Subsequently, the multi-dimensionally bent profiled body X' is supplied to a cutting device E which is capable of cutting the travelling profiled body X' into a predetermined length, as a final molding product. There is further provided a detecting device F between the first and second retaining devices B and C, for example, for measuring the travelling distance or supplied length of the profiled body X' and generating an output signal based on which a controlling device G controls the operation of the bending device D and the cutting device E.

The particulars of the above-mentioned devices, except the spinning device A, according to a preferred embodiment of the invention are as follows. The first retaining device B is formed by an elongate box-like member as shown in FIG. 4, which consists of synthetic resin having an excellent wear resistance and a low friction coefficient, such as polyacetal plastic. The box-like member B defines therein a slit b extending longitudinally therethrough from one end to the other end and having a cross-sectional shape which corresponds to that of the profiled body X', thus permitting the passage of the profiled body X'. The second retaining device C includes a plurality of pairs of horizontal rolls $c_1$, $c_2$ on both sides of the profiled body X', as shown in FIG. 5, which pairs are arranged in series with each other. Furthermore, a pressure roll $c_3$ may be arranged between the horizontal rolls $c_1$, $c_2$ of each pair, to effectively support the cross-sectional center portion of the profiled body X'. In order that the second retaining device C allows a slight lateral or twisting motion of the profiled body X' as it is bent multi-dimensionally by means of the bending device D, the rolls $c_1$, $c_2$, $c_3$ may each include, as shown in FIG. 6, a center bearing e with a rubber-like elastomer s between the bearing e and the outer peripheral portion. These rolls $c_1$, $c_2$, $c_3$ are rotatably carried by a cylindrical carrier member $c_4$ consisting of a pair of substantially semi-cylindrically split halves which are detachable from each other, and which define therein an opening with substantially square cross-section for accommodating the rolls $c_1$, $c_2$, $c_3$. The carrier member $c_4$ itself is rotatably accommodated in a cylindrical bore of a housing block $c_5$, with the inner diameter of the bore corresponding to the outer diameter of the carrier member $c_4$. An adjusting bolt $c_6$ extends between one end surface of the carrier member $c_4$ and an appropriate location on the outer side of the housing block $c_5$ such that the angular position of the carrier member $c_4$ can be adjusted, with respect to the longitudinal axis thereof, by rotating the bolt $c_6$ and thereby increasing or decreasing the effective length of the bolt $c_6$. The carrier member $c_4$ whose angular position has been adjusted by the bolt $c_6$ is fixed to the housing block $c_5$ by means of a bolt $c_7$ in order to prevent undesired rotation thereof.

The detecting device F arranged between the first and second retaining devices B and C, for example, may consist of a rotary encoder, for example, with an input member which is kept in contact with, and driven solely by the travelling profiled body X' and which generates an output signal representing the travelling distance of the profiled body X' without a slipping error. Thus, the supplied length of the profiled body X' before it is applied with multi-dimensional bending can be measured to control the operation of the device D. In order to mount the bending device D, there is provided as shown in FIG. 7 a base plate 10 with a pair of parallel side frame members 11, 12 upstanding from the upper surface of the base plate 10, which are spaced from each other. These frame members 11, 12 fixedly mount thereon a supporting plate 13 for the second retaining device C and the bending device D.

Figure 10:
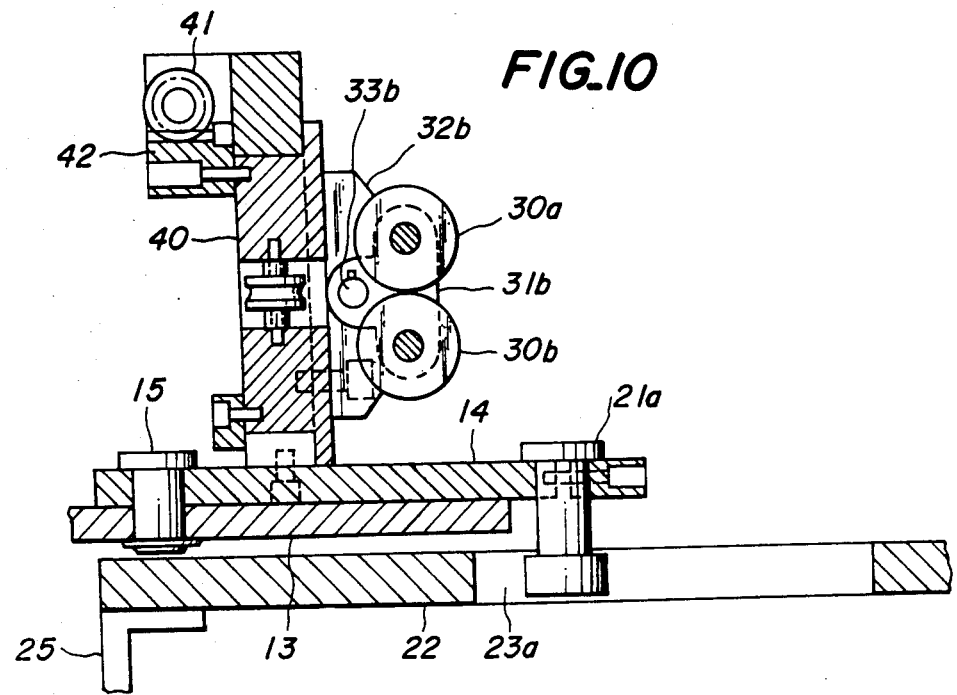
FIG. 10 is a partly sectional side view thereof.

According to one aspect of the present invention, the bending device D has a bottom plate 14 pivotably supported by a vertical pivot 15 on the supporting plate 13 (FIGS. 7, 8, 10). The bottom plate 14 is integrally connected with a vertical plate 16 which is arranged substantially perpendicularly to the travelling direction of the profiled body X', and which carries thereon a horizontal bending mechanism, a vertical bending mechanism, and an axial twisting mechanism to be described hereinafter.

Figure 11:
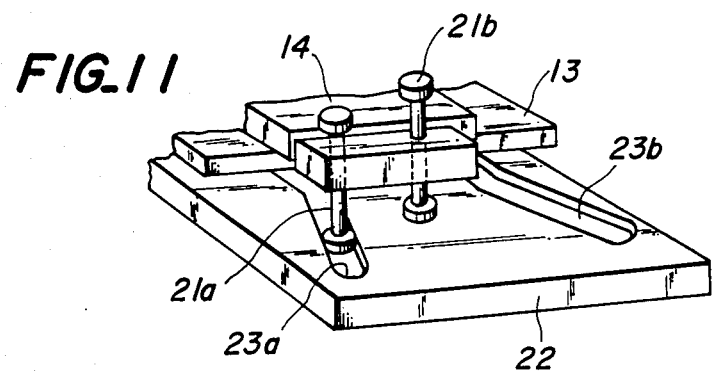
FIG. 11 is a perspective view illustrating the front end portion of the horizontal bending mechanism of the bending device shown in FIG. 7.

As shown in FIG. 8, the horizontal bending mechanism has rolls 20a, 20b, 20c cooperating with each other to define a gap through which the profiled body X' is passed. By these rolls 20a, 20b, 20c, the profiled body X' passing through the gap is retained at least horizontally, so that it can be bent in a horizontal plane either toward right or left by an angular adjustment of the horizontal bending mechanism about the vertical axis of the pivot 15. To this end, as shown in FIG. 11, the bottom plate 14 at its downstream side front end portion carries a pair of donwwardly protruding and vertically slidable guide pins 21a, 21b, and cooperates with a slider plate 22 arranged below the bottom plate 14. The slider plate 22 has a pair of symmetrically formed cam grooves 23a, 23b which can be selectively engaged with, or disengaged from the guide pins 21a, 21b, respectively, and is longitudinally slidably guided by a pair of guide frame members 24a, 24b each having a substantially U-shaped cross-section, which are mounted on the base plate 10 in parallel with the side frame members 11, 12 (FIG. 7). The base plate 10 and the rear end portion of the slider plate 22 are provided with brackets 26, 25, respectively, and an actuator 27 is arranged between the brackets 25, 26, which may consist of a plurality of cylinders having mutually different strokes and connected in series with each other. Thus, an angular adjustment of the horizontal bending mechanism about the vertical axis of the pivot 15 can be effected by suitably actuating the series-connected cylinders 27, causing the slider plate 22 to slide longitudinally along the guide frame members 24a, 24b by a predetermined amount and thereby to guide selected one of the guide pins 21a, 21b along the corresponding one of the cam grooves 23a, 23b. Whether the guide pin 21a is engaged with the cam groove 23a, or the guide pin 21b is engaged with the cam groove 23b, depends on whether the moldings to be produced are used for left side or right side of a vehicle.

Figure 9:
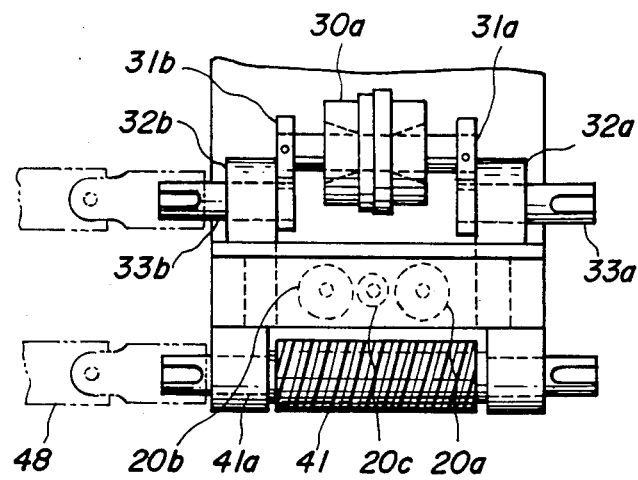
FIG. 9 is a plan view thereof.

As shown in FIGS. 9 and 10, the vertical bending mechanism has a pair of upper and lower rolls 30a, 30b which are arranged behind the rolls 20a, 20b, 20c of the horizontal bending mechanism, and which are rotatably supported by carrier plates 31a, 31b on both sides of the rolls 30a, 30b. These carrier plates 31a, 31b are pivotably supported by vertical brackets 32a, 32b fixedly secured with respect to the vertical plate 16, respectively, such that the carrier plates 31a, 31b can be swung about a common horizontal axis defined by shafts 33a, 33b which are coaxial with each other. These shafts 33a, 33b are fixedly secured to the carrier plates 31a, 31b by keys, and rotatably supported by the brackets 32a, 32b, respectively. At least one of the shafts 33a, 33b is operably connected with an actuator 34 which effects an angular adjustment of the carrier plates 31a, 31b about the horizontal axis. As shown in FIG. 7, the actuator 34 may consist of a plurality of cylinders having mutually different strokes and connected in series with each other, and is fixedly connected at its one end with a fixed bracket 35 and at its other end with a suitable mechanism which converts an input linear motion into an output rotary motion, and which may comprise a cam plate 36 supported and guided for linear motion by appropriate means, not shown. The cam plate 36 has a straight slit 36a which is inclined with respect to the axial direction of the actuator 34, and is engaged with a follower pin 37a at the free end of a crank arm 37. The arm 37 has a crankshaft 37b rotatably journaled by a bearing 38, which crankshaft 37b is connected with the shaft 33b of the carrier plate 31b via a universal joint and a spline shaft 39. The axial length of the spline shaft 39 can be increased or decreased as the bending device D is rotated about the vertical pivot 15 during the angular adjustment of the horizontal bending mechanism. Thus, an angular adjustment of the vertical bending mechanism about the horizontal axis defined by the shaft 33a, 33b can be effected by suitably actuating the series-connected cylinders 34, causing the cam plate 36 to move linearly and thereby to rotate the shaft 33b by a predetermined angle.

Figure 12:
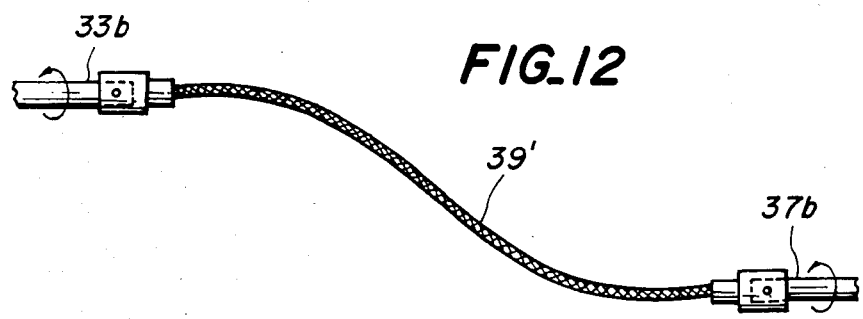
FIG. 12 is a side view of a flexible shaft which may be used to connect the vertical bending mechanism or axial twisting mechanism shown in FIG. 7 with the actuator.

The crankshaft 37b may be connected with the shaft 33b of the vertical bending mechanism through a flexible shaft 39' as shown in FIG. 12, which consists of steel wires wrapped around a core in alternately directed layers. In this case, preferably, two flexible shafts 39' are arranged on both sides of the cam plate 36 and connected to the shafts 33a, 33b, respectively, such that the shafts 33a, 33b are rotated by the two flexible shafts in the same direction.

As shown in FIGS. 8 to 10, the axial twisting mechanism has a rotary plate 40 which supports the above-mentioned horizontal and vertical bending mechanisms and which, in turn, is rotatably supported by the vertical plate 16. The vertical plate 16 rotatably supports a worm gear 41 also, which is meshed with a sector worm wheel 42 fixedly secured to the rotary plate 40. Like the horizontal and vertical bending mechanisms, the axial twisting mechanism has an actuator 43 connected to a fixed bracket 46, which may consist of a plurality of cylinders having mutually different strokes and connected in series with each other. The actuator 43 is connected, as shown in FIG. 7, to the shaft 41a of the worm gear 41 through a rack 44, a pinion 45 rotatably journaled by bearings 47, a spline shaft 48 and a universal joint. Thus, an angular adjustment of the axial twisting mechanism about the axis of the rotary plate 40 can be effected by suitably actuating the series-connected cylinders 43, causing the rack 44 to move linearly and thereby to rotate the worm gear 41 by a predetermined angle.

Figure 16:
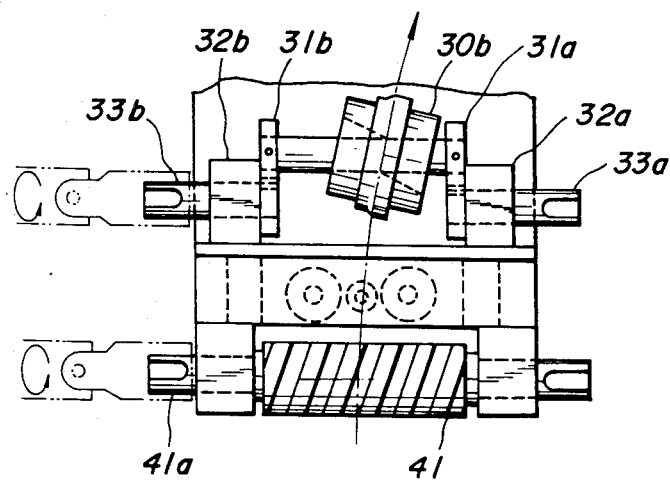
FIG. 16 is a plan view similar to FIG. 9, explaining the operation of the vertical bending rolls in response to the angular adjustment of the horizontal bending mechanism.

Because the axial twisting mechanism forcedly twists the profiled body X' about its longitudinal axis, the rolls 20a, 20b, 20c, 30a, 30b of the horizontal and vertical bending mechanisms are preferably arranged such that they have an adequate followability with respect to the forced twisting of the profiled body X'. Thus, for example, each of the rolls 20a, 20b, 20c of the horizontal bending mechanism may have a center bearing and a rubber-like elastomer between the bearing and the outer peripheral portion, like the rolls $c_1$, $c_2$, $c_3$ of the second retaining device C as shown in FIG. 6. Furthermore, each of the rolls 30a, 30b of the vertical bending mechanism may have an inner bore whose diameter increases from the longitudinal center portion toward both ends thereof, such that these rolls are permitted to tilt with respect to the axes of the respective supporting shafts, as shown in FIG. 16, and are thus automatically adapted to the variation in the radius of horizontal curvature of the profiled body X'.

Figure 15:
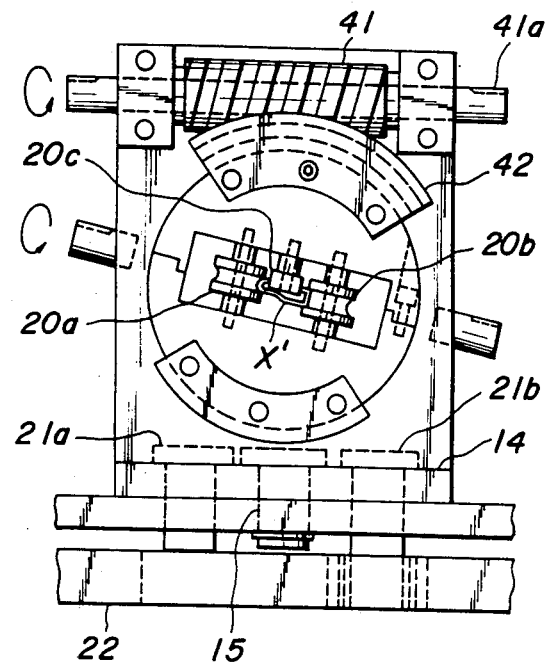
FIG. 15 is a front view similar to FIG. 8, explaining the operation of the axial twisting mechanism.

With the above-described bending device D, the desired multi-dimensional or complex bending of the profiled body X' is effected by adjusting the horizontal and vertical bending mechanisms and the axial twisting mechanism in the following manner. As particularly shown in FIGS. 7, 11 and 13, in order to vary the curvature or radius of curvature of the profiled body X' in the horizontal plane, the series-connected actuator cylinders 27 are selectively operated so that the slider plate 22 slides longitudinally along the guide frame members 24a, 24b by a predetermined amount. Consequently, the guide pin 21a or 21b is guided along the cam groove 23a or 23b, and thus the bottom plate 14 mounting thereon the three mechanisms rotates about the axis of the pivot 15, so that the direction of the gap defined by the rolls 20a, 20b on both sides of the profiled body X' is changed in the horizontal plane to bend the profiled body X' horizontally either toward left or right at a desired angle. Also, as particularly shown in FIGS. 7, 10 and 14, in order to vary the curvature or radius of curvature of the profiled body X' in the vertical plane, the series-connected actuator cylinders 34 are selectively operated so that the cam plate 36 moves longitudinally and linearly by a predetermined amount. Since the slit 36a of the cam plate 36 is engaged by the follower pin 37a of the crank arm 37, the linear motion of the cylinders 34 is converted into a rotary motion of the crankshaft 37b, which rotary motion is transmitted to the shaft 33b of the carrier plate 31b via the universal joint and spline shaft 39. Consequently, the upper and lower rolls 30a, 30b together with the carrier plates 31a, 31b are bodily rotated about the horizontal axis of the shafts 33a, 33b, so that the rolls 30a, 30b bend the profiled body X' in the vertical plane either upwardly or downwardly at a desired angle. Furthermore, in addition to the two-dimensional horizontal and vertical bendings discussed above, the profiled body X' may be axially twisted in order to compensate for possible distortion thereof resulting from the horizontal and/or vertical bending, or to effect a three dimensional bending. To this end, as particularly shown in FIGS. 7, 8 and 15, the series-connected actuator cylinders 43 are selectively operated so that the rack 44 moves longitudinally by a predetermined amount. Consequently, the worm gear 41 is rotated by the rack 44, through the pinion 45, spline shaft 48 and universal joint, and rotates the sector worm wheel 42 together with the rotary plate 40 which is supported by the vertical plate 16 and mounts thereon the horizontal and vertical bending mechanisms. When these adjustments are continuously effected, e.g. sequentially or simultaneously, the profiled body X' can be bent either two-dimensionally or three-dimensionally, to have a desired complex curvature of the product.

Figure 17:
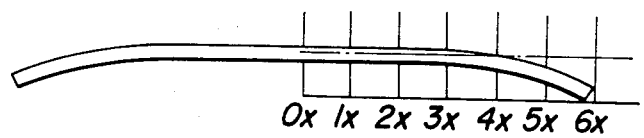
FIG. 17 is a plan view of a molding produced in accordance with the present invention.
Figures 18A, 18B, 18C, 18D:
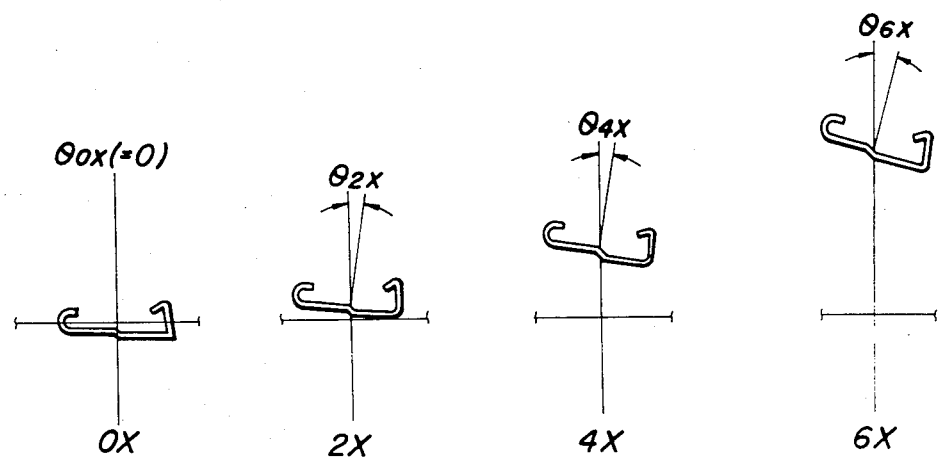
FIGS. 18(a) to 18(d) are sectional views of the molding shown in FIG. 17, explaining the complex curvature and axial twisting thereof.
Figure 19:
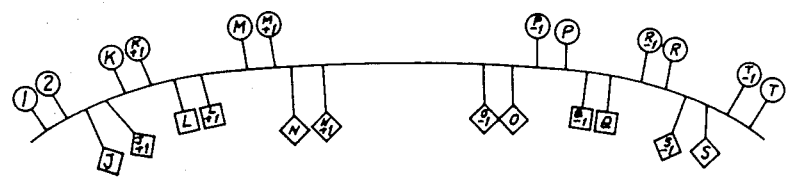
FIG. 19 is a plan view similar to FIG. 17, explaining the relation between finely divided imaginary segments of the molding and the stored program memory for controlling the bending device.

According to the present invention, a window molding $M_6$ (FIG. 2(a)), for example, can be produced accurately and economically by making use of the bending machine explained above, even when the molding has a curvature not only in the horizontal plane as shown in FIG. 17, but also in the vertical plane, and is axially twisted as shown in FIG. 18(a) to (d) illustrating vertical deflections and twisting angles $\theta_{0x}(=0)$, $\theta_{2x}$, $\theta_{4x}$, $\theta_{6x}$ of the molding at its longitudinally spaced locations $0x$, $2x$, $4x$, $6x$. Advantageously, these moldings are produced automatically, by dividing the entire length of the molding into an appropriate number of imaginary segments 1 to T each having a constant length. These segments can readily be identified by detecting the length of the profiled body X' supplied to the bending device D, by means of the detecting device F shown in FIG. 3, which may consist of a rotary encoder whose output signal is supplied to the control device G with stored control memories for the actuator cylinders 27, 34, 43 by which the horizontal and vertical bendings and axial twisting of the profiled body X' are controlled with respect to each of the segment. For example, a rear window molding $M_6$ whose entire length is about 1,500 mm may be divided into 30 to 32 or 50 to 60 segments as shown in FIG. 19 with respect to each of which the control device G has a stored program memory for controlling the horizontal and vertical bending mechanisms and the axial twisting mechanism. These memories are shown in FIG. 20 and may be in the form of radii of curvature (mm) in horizontal and vertical planes and of the twisting angle, based on which the horizontal and vertical bendings and the axial twisting are effected in accordance with the operational chart as shown in FIG. 21.

In the above-mentioned embodiment of the present invention, moldings made of a profiled body of the same cross-sectional shape and with different two- or three-dimensional curvature may readily be produced by changing the program memory stored in the controlling device G and, if necessary, by changing the slider plate 22 and the cam plate 36 with a plate having a different configuration of the cam groove or slit. Thus the time required for the preparation of producing different moldings can be minimized.

According to the present invention, in order to produce the desired molding, the horizontal and vertical bending mechanisms and the axial twisting mechanism can be actuated angularly with respect to their respective operational axes, and the actuators for these mechanisms can be mechanically isolated therefrom. Consequently, the moving mass and inertia of the bending device D can be minimized and the required bending operation can be carried out very accurately, substantially freely from the adverse influence of inertia. Moreover, since the three mechanisms of the bending device are rotatably mounted on a common vertical plate, the device can be made very compact and produced economically. When flexible shafts as shown in FIG. 12 are used to connect the mechanisms with the respective actuators, not only the moving mass can be further reduced, but also the location of the actuators can be determined relatively freely so that the required space for the bending device can be minimized.

Figure 22:
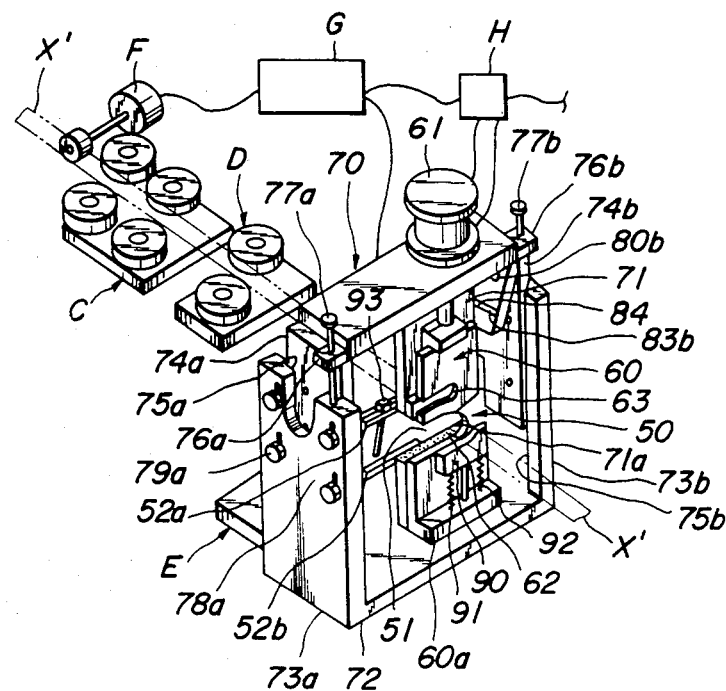
FIG. 22 is a perspective view of a cutting device which may suitably be combined with the bending device shown in FIG. 7.
Figure 23:
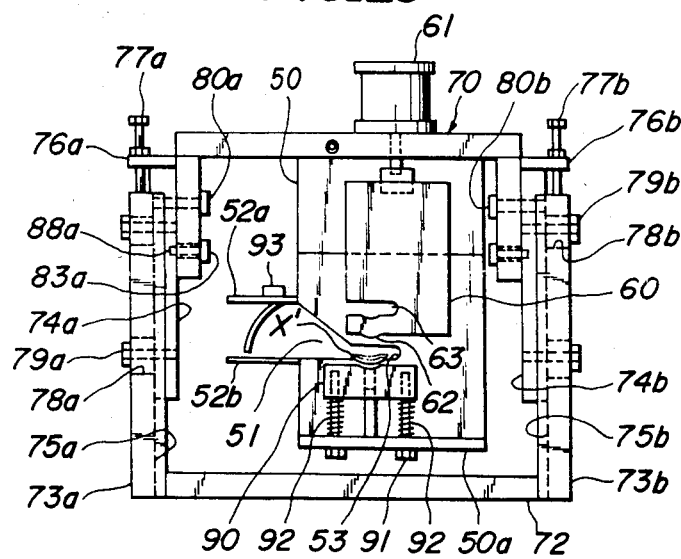
FIG. 23 is a front view thereof.

According to another aspect of the present invention, the cutting device E arranged behind the bending device D, for cutting the multi-dimensionally bent profiled body X' into a predetermined length, comprises fixed and movable blade members 50, 60 as shown in FIGS. 22 and 23. For the sake of clarity, the second retaining device C and the bending device D are illustrated in FIG. 22 in a simplified manner. The fixed blade member 50 is fixedly secured to a portal frame 70 through a supporting plate 71, and has an opening 51 formed therein to permit passage of the profiled body X' to be cut by the device E. A corresponding opening 71a aligned with the opening 51 is formed in the supporting plate 71. When the profiled body X' has only a slight lateral deflection as a result of the complex bending, the openings 51, 71a may be in the form of laterally elongate oval hole having a closed contour. When, however, the profiled body X' has a substantial lateral deflection which exceeds the width of the openings 51, 71a, they may be in the form of laterally extending slit having a side aperture. Laterally protruding upper and lower guide arms 52a, 52b may be connected to the upper and lower edges of the side aperture of the opening 51, such that the guide arms 52a, 52b define a space therebetween which is continuous with the opening 51 and which allows the passage of the profiled body X'. The fixed blade member 50 has its lower edge of the opening 51 formed as a cutting edge 53 with a configuration corresponding to the lower profile of the profiled body X' so that the cutting edge 53 properly supports the profiled body X' during the cutting operation. The movable blade member 60 is slidably in contact with the fixed blade member 50, and is connected with an actuating cylinder 61 at the lower end of the piston rod thereof, which actuating cylinder 61 is mounted on the frame 70. The movable blade member 60 has its lower edge formed as a cutting edge 62, so that the cutting of the profiled body X' is effected by, and between the cutting edge 53 of the fixed blade member 50 and cutting edge 62 of the movable blade member 60. The movable blade member 60 has a laterally extending slit 63 at that location thereof which comes into alignment with the opening 51 of the fixed blade member 50 at the lower dead point of the actuating cylinder 61. This slit 63 has a lateral width which is made smaller than the maximum excursion of the profiled body X' in the opening 51 of the fixed blade member 50. The frame 70 supporting the two blade members 50, 60 is arranged above a base plate 72 having a pair of upwardly protruding side plates 73a, 73b on both sides thereof. Adjacent to the side plates 73a, 73b, a pair of slider plates 74a, 74b are arranged which are vertically slidably received in guide grooves 75a, 75b formed in the side plates 73a, 73b, respectively, and which mount thereon the frame 70. The slider plates 74a, 74b are provided with side lugs 76a, 76b having height adjusting bolts 77a, 77b which are threadedly engaged with the lugs 76a, 76b and of which the lower ends abut with the upper end surfaces of the side plates 73a, 73b, respectively. The height of the slider plates 74a, 74b adjusted by the bolts 77a, 77b is maintained by tightening bolts 79a, 79b which are movable along vertically extending guide slits 78a, 78b formed in the side plates 73a, 73b, and which are threaded into the slider plates 74a, 74b. The frame 70 has on both sides thereof downwardly protruding flanges provided with horizontal pivots 80a, 80b pivotably supporting the frame 70 with respect to the slider plates 74a, 74b, which pivots 80a, 80b are arranged slightly above the center of gravity of the frame 70 and elements associated therewith, such as the two blade members 50, 60 and actuating cylinder 61. An optimum vertical position of the center of gravity of the frame 70 can readily be obtained by adjusting the effective length of rods 81a, 81b which project rearwardly and forwardly from the frame 70 and carry counterweights 82a, 82b, respectively. The swinging motion of the frame 70 forwardly about the pivots 80a, 80b is limited within a suitable constant range by means of pins 83a, 83b secured to the slider plates 74a, 74b so as to project into recesses 84a, 84b which are formed in the flanges and which are elongate in the direction of the swinging motion of the frame 70. In order that the frame 70 can be returned to the neutral or initial angular position quickly, the base plate 72 has an upwardly protruding projection 85 and a tension spring 86 is arranged between the projection 85 and the supporting plate 71 for the fixed blade member 50. The neutral or initial angular position of the frame 70 can be determined and adjusted by the length of a bolt 87 which is threaded into the projection 85 and protrudes forwardly to abut with the supporting plate 71.

Below the lower dead point of the movable blade member 60, there is provided a pressure plate 90 vertically movably supported by guide shafts 91, 91 passed through a horizontal flange 50a of the fixed blade member 50, and springs 92, 92 are fitted around these shafts 91, 91 between the horizontal flange 50a and the pressure plate 90 to urge the pressure plate 90 upwardly. The cutting operation or downward movement of the movable blade member 60 is controlled by the controlling device G in accordance with the output signal of the detecting device F representing the length of the supplied profiled body X', which controlling device G operates or controls the opening of a valve H for the pressure fluid to be used to actuate the cylinder 61. The return motion or upward movement of the blade member 60 is controlled by a detector 93, such as a limit switch secured to the upper guide arm 52a, whose output signal also is supplied to the controlling device G to actuate the valve H so as to retract the piston of the cylinder 61.

Figure 24:
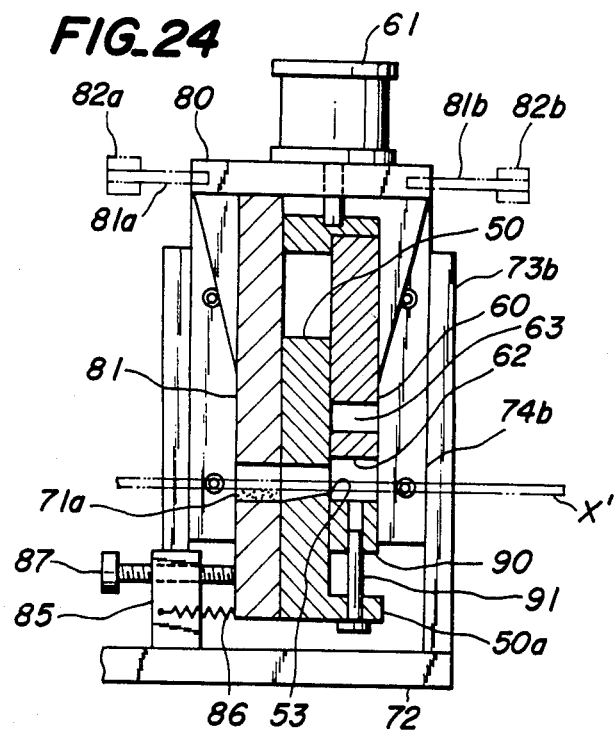
FIG. 24 is a partly sectional side view thereof.
Figure 25:
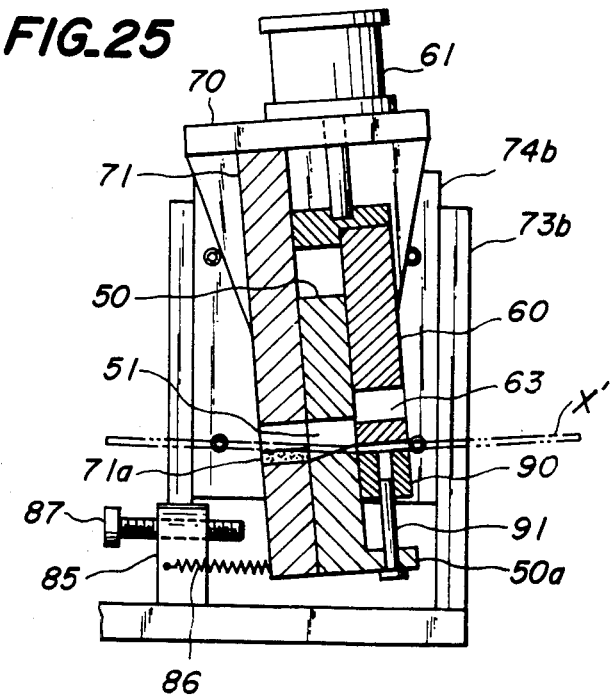
FIG. 25 is a partly sectional side view similar to FIG. 24, with the cutting device in a position in which the cutting operation is started.

The above-mentioned cutting device E is arranged with respect to the multi-dimensionally bent profiled body X' such that, when the detecting device F detects that a predetermined length of the profiled body X' has been supplied to the bending device D and the cutting is thus to be effected by actuating the movable blade member 60, the profiled body X' travels through the opening 51 of the fixed blade member 50, as shown in FIG. 24. By actuating the cylinder 61 and thereby moving the movable blade member 60 downwardly, the cutting operation of the profiled body begins to take place between the cutting edges 53, 62 of the two blade members 50, 60, during which operation these blade members 50, 60 starts to forwardly swing about the axis of the pivots 80a, 80b in accordance with the continued supply of the profiled body X' (FIG. 25). During this swing motion, the portion of the profiled body X' clamped between the cutting edges 53, 62 of the two blade members 50, 60 is pressed by the movable blade member 60 downwardly against the upper surface of the lower periphery of the opening 51 in the fixed blade member 50, and is also lifted slightly upwards by the swinging motion of the frame 70 and the blade members 50, 60. Thus, preferably, the upper surface of the lower periphery of the opening 51 in the fixed blade member 50 is inclined rearwardly and downwardly, and adjacent upper surface of the lower periphery of the opening 71a in the supporting plate 71 is provided with a cushioning member made, for example, of an appropriate synthetic resin, in order to prevent possible formation of scratches on the surface of the profiled body X'. This swing motion is continued until completion of the cutting operation, when the movable blade member 60 reaches the lower dead point and the slit 63 of the movable blade member 60 comes into alignment with the opening 51 of the fixed blade member 50. The rear end of the profiled body X' cut into the predetermined length as a molding product is resiliently clamped between the cutting edge 62 of the movable blade member 60 and the upper surface of the pressure plate 90. Because the slit 63 in alignment with the opening 51 permits entry and passage therethrough of the profiled body X' and the two blade members 50, 60 can be swung independently of the continued supply of the profiled body X', the two blade members 50, 60 are returned to their neutral or initial angular position by the force of the tension spring 86 quickly. After this return motion, the profiled body X', continues to initially travel through the slit 63 of the movable blade member 60 as shown in FIG. 26. However, at least at that longitudinal position of the profiled body X' where the lateral deflection is the maximum, the profiled body X' moves laterally out of the slit 63, as shown by imaginary line in FIG. 27. Such a lateral movement of the profiled body X' is detected by the detector 93 whose output signal is used to actuate the cylinder 61 and move the movable blade member 60 upwardly. By this, the profiled body X' which has already been cut into the desired length as a molding product and clamped between the movable blade member 60 and the pressure plate 90 is now released and can be taken out as a stock to be stored at appropriate location. Furthermore, the movable blade member 60 moved upwardly is maintained in its uppermost position until a predetermined length of the profiled body X' is further supplied to the bending device D and a next cutting operation is thus to be effected.

It will be appreciated that the above-mentioned cutting device E of the present invention makes it possible to cut continuously supplied profiled body with multi-dimensional curvature into a predetermined length of the product very efficiently with a markedly improved productivity, since the continuous supply of the profiled body need not be interrupted during the period in which the cutting operation and return motion of the movable blade member are effected. While the cutting device of the present invention can be combined with the above mentioned complex bending device advantageously, it is not limited to such an application only, and may be used in another type of bending machine which effects continuous multi-dimensional bending of an elongate material. Furthermore, various modifications are possible with respect to the cutting device within the scope of the present invention. For example, instead of pivotably supporting the frame 70 and the two blade members 50, 60 so as to swing about the pivots 80a, 80b, they may be supported reciprocably in the direction in which the profiled body X' is supplied. In this case, the frame 70 and the cutting blades 50, 60 are moved forwardly during the cutting operation, in accordance with the travel of the profiled body X', and are returned rearwardly as the cutting operation is completed.

Figure 28:
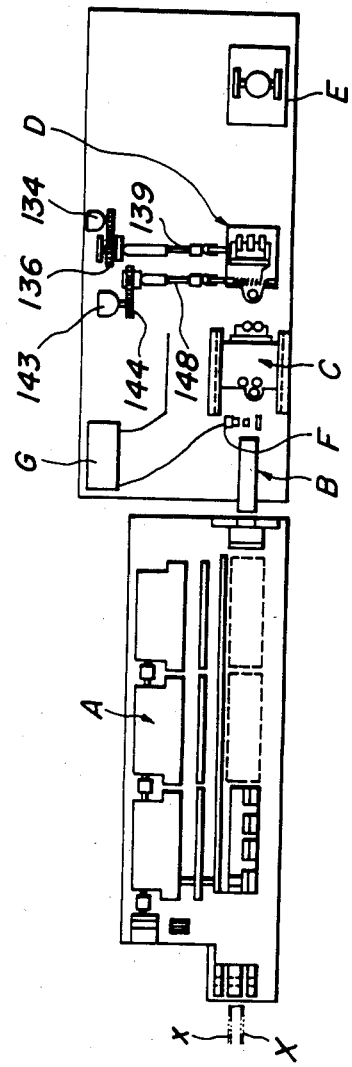
FIG. 28 is a plan view of the complex bending machine according to another embodiment of the present invention.
Figure 29:
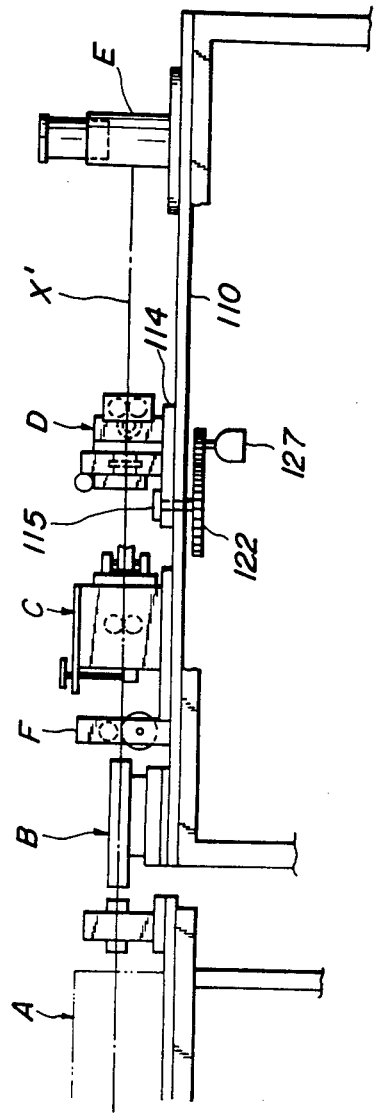
FIG. 29 is a side view thereof.

Another preferred embodiment of the complex bending machine according to the present invention is shown in FIGS. 28 and 29, wherein the base plate 110 mounts thereon an assembly comprising the first and second retaining devices B and C, the bending device D, the cutting device E, the detecting device F and the controlling device G. In this embodiment also, the bending device D comprises horizontal and vertical bending mechanisms and axial twisting mechanism, and has its bottom plate 114 pivotably supported by a vertical pivot 115 which is fixedly secured to the base plate 110. This pivot 115 is rotatably supported by, and extends downwardly through the base plate 110, and carries on its lower end a reduction gear train 122 coupled to a servo-motor 127 which is controlled by the controlling device G, and is used to horizontally adjust the angular position of the rolls forming the horizontal bending mechanism and to vary the curvature of the profiled body X' in the horizontal plane. Similarly, the vertical bending mechanism is actuated by a servo-motor 134 connected to the input shaft of the mechanism through a reduction gear train 136, a spline shaft 139 and a universal joint, such that the angular position of the rolls forming the vertical bending mechanism can be adjusted by the servo-motor 134 vertically about a horiontal axis, in order to vary the curvature of the profiled body X' in the vertical plane. The axial twisting mechanism also is actuated by a servo-motor 143 connected to the input shaft of the mechanism through a reduction gear train 144, a spline shaft 148 and a universal joint, such that the angular position of the mechanism can be adjusted by the servo-motor 143 about the longitudinal axis, in order to compensate for possible distortion of the profiled body X' or to effect a three-dimensional bending. The servo-motors 127, 134, 143 may each consist of a hydraulic motor or a pulse motor with which a necessary adjustment of the relevant mechanism can be effected vary accurately and in a very reliable manner.

With the bending device of the present invention explained above, the elongate profiled body X' is bent horizontally by the rolls of the horizontal bending mechanism in the region of the profiled body X' between the horizontal bending mechanism and the second retaining device C, and thus bent profiled body X' is subsequently supplied to the vertical bending mechanism to be bent vertically by the rolls of the latter mechanism. From this reason, when the profiled body X' is bent horizontally to have a smaller radius of horizontal curvature, and the angular position of the bending device is thereafter adjusted about the vertical pivot such that the radius of horiontal curvature of the profiled body X' increases, the vertically arranged pair of rolls forming the vertical bending mechanism exerts upon the profiled body a lateral force which may increase the intended smaller radius of horizontal curvature of that portion of the profiled body which has now reached the vertical bending mechanism. This is because the horizontal radius of curvature of the profiled body between the rolls of the horizontal bending mechanism is greater than that of the profiled body between the rolls of the vertical bending mechanism, whereas the two mechanisms are mounted on a common bottom plate and are thus simultaneously adjusted angularly about a common vertical pivot.

Figure 30:
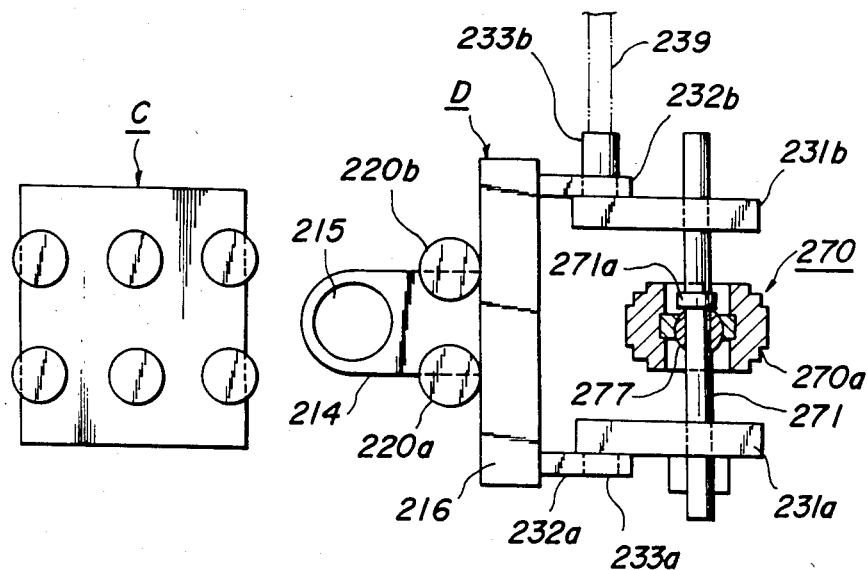
FIG. 30 is a partly sectional fragmentary plan view of the bending device according to still another embodiment of the present invention.
Figure 31:
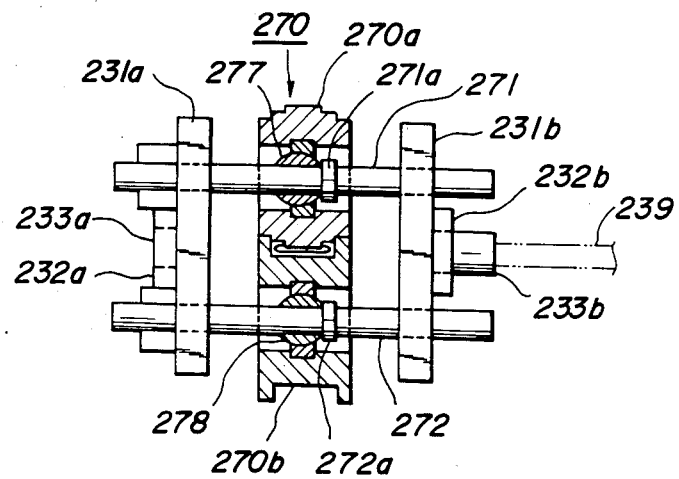
FIG. 31 is a partly sectional fragmentary front view of the vertical bending mechanism shown in FIG. 30.

Such a problem can be eliminated by still another embodiment of the present invention shown in FIGS. 30 and 31, in which also the bottom plate 214 of the bending device D pivotably supported by a vertical pivot 215 and mounting thereon rolls 220a, 220b forming the horizontal bending mechanism has a vertical plate 216 which supports the vertical bending mechanism. More particularly, as in the embodiment shown in FIGS. 9 and 10, a pair of vertical brackets 232a, 232b are fixedly secured with respect to the vertical plate 216 and pivotably support carrier plates 231a, 231b, respectively, such that the carrier plates 231a, 231b can be swung about a common horizontal axis defined by shafts 233a, 233b at least one of which is connected to an actuator through appropriate power transmission element 239. A pair of horizontal supporting shafts 271, 272, which are in parallel with, and vertically spaced from each other, extend between the carrier plates 231a, 231b and support the rolls 270a, 270b, respectively, which rolls form the roll pair 270 of the vertical bending mechanism. These rolls 270a, 270b are supported by the supporting shafts 271, 272 with universal bushes 277, 278 therebetween, which bushes 277, 278 are formed with spherical mating surfaces to permit a limited omnidirectional tilting motion of the rolls 270a, 270b with respect to their supporting shaft 271, 272. The bushes 277, 278 are retained in position by flanges 271a, 272a formed on the outer peripheries of the supporting shafts 271, 272 which, in turn, are slidable in the axial direction thereof relatively to the bracket plates 231a, 231b.

The operation of the above-mentioned arrangement is as follows. Assuming that a horizontal bending of the profiled body X' has just been effected by the rolls 220a, 220b of the horizontal bending mechanism with a larger adjusting angle of the bottom plate 214 about the vertical pivot 215 in an attempt to obtain a smaller radius of horizontal curvature of the profiled body over a desired length, as shown in FIG. 32(a), thus obtained smaller radius of horizontal curvature is prevented from being unintentionally increased by the rolls 270a, 270b of the vertical bending mechanism even when the angular position of the bottom plate 214 is readjusted about the vertical pivot 215 to increase the radius of horizontal curvature along the succeeding portion of the profiled body X'. Because, as shown in FIG. 32(b), the bushes 277, 278 having spherical mating surfaces permit the rolls 270a, 270b to tilt with respect to the axes of the supporting shafts 271, 272, and these shafts 271, 272 themselves are axially slidable together with the rolls 270a, 270b. In other words, the orientation and lateral position of the vertical bending rolls 270a, 270b are automatically adapted to the variation in the radius of horizontal curvature of the profiled body X', so that the radius of horizontal curvature can be varied with less restrictions, and the intended radius of horizontal curvature, which varies longitudinally of the profiled body, is not affected by the vertical bending rolls. In this embodiment, the vertical bending of the profiled body can be effected essentially in the same manner as described with respect to FIGS. 7, 10 and 14, and there may be provided an axial twisting mechanism, if necessary.

Figure 33:
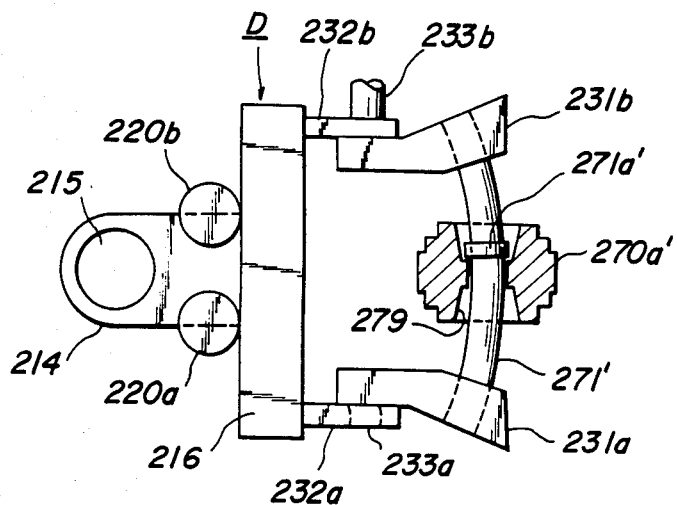
FIG. 33 is a partly sectional plan view similar to FIG. 30, showing a modification of the vertical bending mechanism.

A modification is shown in FIG. 33, wherein the vertical bending rolls can be automatically adapted to the angular adjustment of the horizontal bending mechanism without using the universal bushes mentioned above. In this case, a supporting shaft 271' having an arcuate configuration is used to support the roll 270a' with an inner bore 279 whose diameter increases from the center toward both ends thereof. The shaft 271' is axially supported by the carrier plates 231a, 231b and has a flange 271a' to retain the roll 270a' axially in position with respect thereto. This arrangement also ensures that the radius of horizontal curvature of the profiled body can be varied with less restrictions, and the intended radius of horizontal curvature, which varies longitudinally of the profiled body, is not affected by the vertical bending rolls.

Those skilled in the art will appreciate that the present invention so far described with respect to certain preferred embodiments is not limited thereto, and a number of modifications and variations can be made without departing from the scope of the present invention defined in the claims attached hereto. In the illustrated embodiments, for example, the horiontal and vertical bending mechanisms are each provided with a pair of rolls which are advantageous in that undesirable scratches can effectively be prevented from being made on the surface of the product during the bending operation. However, in case of producing articles for which slight surface scratches do not raise essential problems, such as door sashes or the like, block-like shoes formed with a slit for passing the raw material therethrough, like the first retaining device B, may be used instead of the rolls which require a relatively complicated machining.

What is claimed is:

1. A cutting device for a multi-dimensional bending apparatus for producing multi-dimensionally bent elongate articles, such as door sashes, various moldings for automobiles, and the like, and including a bending device for multi-dimensionally bending continuously supplied elongate material, wherein the cutting device comprises a fixed blade member formed therein with an opening through which the multi-dimensionally bent material is passed, and a movable blade member vertically movable with respect to, and kept in sliding contact with the fixed blade member, cutting edges being formed by the lower peripheral edge of the opening in the fixed blade member and the lower edge of the movable blade member, said blade members being movable also in the direction in which the material is supplied, synchronously with the cutting of the supplied material, said movable blade member having a lower dead point and being formed with a slit having a side aperture, which slit can be brought into alignment with the opening in the fixed blade member in the lower dead point of the movable blade member such that continuously supplied material is permitted to pass through the slit upon completion of the cutting, said slit having a width smaller than the maximum lateral excursion of the bent material and means to upwardly move the movable blade member to its original position when the bent material moves laterally out of said slit.

2. The apparatus as claimed in claim 1, further comprising a detector mounted adjacent to the opening in the fixed blade member so as to detect the movement of the material laterally out of the slit.

3. An apparatus for producing multi-dimensionally bent elongate products, comprising: retaining means for retaining an elongate material laterally while guiding sliding movement of the material longitudinally thereof; detecting means for detecting the supplied length of the material; a multi-dimensional bending device, actuated in response to the output signal of the detecting means, for continuously bending the material; and a cutting device, actuated in response to the output signal of the detecting means, for cutting continuously supplied, multi-dimensionally bent material wherein the cutting device includes a fixed blade member formed therein with an opening through which the multi-dimensionally bent material is passed, and a movable blade member vertically movable with respect to, and kept in sliding contact with the fixed blade member, cutting edges being formed by the lower peripheral edge of the opening in the fixed blade member and the lower edge of the movable blade member, said blade members being movable also in the direction in which the material is supplied, synchronously with the cutting of the supplied material, said movable blade member having a lower dead point and being formed with a slit having a side aperture, which slit can be brought into alignment with the opening in the fixed blade member in the lower dead point of the movable blade member such that continuously supplied material is permitted to pass through the slit upon completion of the cutting, said slit having a width smaller than the maximum lateral excursion of the bent material and means to upwardly move the moveable blade member to its original position when the bent material moves laterally out of said slit.

4. The apparatus as claimed in claim 3, further comprising a detector mounted adjacent to the opening in the fixed blade member so as to detect the movement of the material laterally out of the slit.

* * * * *